United States Patent
Fu et al.

(10) Patent No.: US 8,495,429 B2
(45) Date of Patent: Jul. 23, 2013

(54) LOG MESSAGE ANOMALY DETECTION

(75) Inventors: Qiang Fu, Beijing (CN); Jian-Guang Lou, Beijing (CN); Jiang Li, Beijing (CN)

(73) Assignee: Microsoft Corporation, Redmond, WA (US)

( * ) Notice: Subject to any disclaimer, the term of this patent is extended or adjusted under 35 U.S.C. 154(b) by 37 days.

(21) Appl. No.: 12/786,837

(22) Filed: May 25, 2010

(65) Prior Publication Data
US 2011/0296244 A1   Dec. 1, 2011

(51) Int. Cl.
*G06F 11/00* (2006.01)

(52) U.S. Cl.
USPC .............. 714/38.1; 714/25; 714/47.1; 714/49

(58) Field of Classification Search
USPC ................. 714/20, 25, 37, 38.1, 39, 45, 47.1, 714/47.3, 49
See application file for complete search history.

(56) References Cited

U.S. PATENT DOCUMENTS

| | | | |
|---|---|---|---|
| 5,941,996 A | 8/1999 | Smith et al. | |
| 6,173,418 B1* | 1/2001 | Fujino et al. | 714/20 |
| 7,721,152 B1* | 5/2010 | Joshi et al. | 714/25 |
| 2005/0223283 A1* | 10/2005 | Frey et al. | 714/20 |
| 2008/0027688 A1* | 1/2008 | Jiang et al. | 714/820 |
| 2008/0319940 A1* | 12/2008 | Garg et al. | 707/2 |
| 2009/0282480 A1 | 11/2009 | Lee et al. | |
| 2011/0083123 A1 | 4/2011 | Lou et al. | |
| 2011/0131453 A1* | 6/2011 | Fernandess et al. | 714/37 |
| 2011/0185234 A1* | 7/2011 | Cohen et al. | 714/37 |

OTHER PUBLICATIONS

Xu, et al., "Online System Problem Detection by Mining Patterns of Console Logs", Retrieved at << http://www2.berkeley.intel-research.net/~hling/research/log_icdm09.pdf>>, ICDM, Proceedings of the 2009 Ninth IEEE International Conference on Data Mining, Dec. 6-9, 2009, pp. 10.

Tan, et al., "Mochi: Visual Log-Analysis Based Tools for Debugging Hadoop", Retrieved at << http://www.pdl.cmu.edu/PFL-FTP/stray/mochi_tan_hotcloud09.pdf >>, Workshop on Hot Topics in Cloud Computing (HotCloud '09), Jun. 15, 2009, pp. 1-5.

Tierney, et al., "Using NetLogger for Distributed Systems Performance Analysis of the BaBar Data Analysis System", Retrieved at << http://www-didc.lbl.gov/papers/chep.2K.Netlogger.pdf >>, Proceedings of Computers in High Energy Physics, (CHEP 2000), Feb. 2000, pp. 4.

Cho, et al., "Daikon: Invariant Detection of Nemo in association with OMP Project", Retrieved at << http://www.cs.cmu.edu/~aldrich/courses/654/tools/omparchitectability-daikon-06.pdf >>, 2006, pp. 1-16.

(Continued)

*Primary Examiner* — Joseph D Manoskey
(74) *Attorney, Agent, or Firm* — Microsoft Corporation

(57) ABSTRACT

One or more techniques and/or systems are disclosed for detecting anomalies in a message log. A log message is parsed from an unstructured text string to a structured form, comprising messages signature and parameter values. Structured log messages that contain a same parameter value of a same program variable are grouped together. One or more invariants for are identified from respective types of log message groups. Invariants are applied to log sequences of respective log types.

20 Claims, 11 Drawing Sheets

OTHER PUBLICATIONS

Reidemeister, et al., "Diagnosis of Recurrent Faults using Log Files", Retrieved at << http://delivery.acm.org/10.1145/1730000/1723031/p12-reidemeister.pdf?key1=1723031&key2=7776841721&coll=GUIDE&dl=GUIDE&CFID=86524900&CFTOKEN=69931759 >>, IBM Centre for Advanced Studies Conference, Proceedings of the 2009 Conference of the Center for Advanced Studies on Collaborative Research, Nov. 2-5, 2009, pp. 12-23.

Jiang, et al., "Detection and Diagnosis of Recurrent Faults in Software Systems by Invariant Analysis", Retrieved at << http://ieeexplore.ieee.org/stamp/stamp.jsp?tp=&arnumber=4708890 >>, 11th IEEE High Assurance Systems Engineering Symposium, HASE 2008, Dec. 3-5, 2008, pp. 323-332.

Rouillard, John P., "Real-time Log File Analysis Using the Simple Event Correlator (SEC)", Retrieved at << http://www.cs.umb.edu/~rouilj/sec/sec_paper.pdf >>, Nov. 2004, pp. 1-25.

Prewett, James E., "Analyzing Cluster Log Files Using Logsurfer", Retrieved at << http://citeseerx.ist.psu.edu/viewdoc/download?doi=10.1.1.5.8610&rep=rep1&type=pdf >>, In Annual Conference on Linux Clusters, 2003, pp. 1-12.

Hansen, et al., "Automated System Monitoring and Notification with Swatch", Retrieved at << http://www.usenix.org/publications/library/proceedings/lisa93/full_papers/hansen.ps >>, System Administration Conference, Proceedings of the 7th USENIX conference on System administration, Nov. 1-5, 1993, pp. 9.

Oliner, et al., "What Supercomputers Say: A Study of Five System Logs", Retrieved at << http://www.cs.sandia.gov/~jrstear/sisyphus/oliner_dsn_2007_slides.pdf >>, DSN, Proceedings of the 37th Annual IEEE/IFIP International Conference on Dependable Systems and Networks, Jun. 26, 2007, pp. 21.

Xu, et al., "Detecting Large-Scale System Problems by Mining Console Logs", Retrieved at << http://www.sigops.org/sosp/sosp09/papers/xu-sosp09.pdf >>, ACM Symposium on Operating Systems Principles, Proceedings of the ACM SIGPOS 22nd symposium on Operating systems principles, Oct. 11-14, 2009, pp. 1-16.

Xu, et al., "Mining Console Logs for Large-Scale System Problem Detection", Retrieved at << http://www.usenix.org/event/sysml08/tech/full_papers/xu/xu.pdf >>, In Proceedings of the Third Workshop on Tackling Computer Systems Problems with Machine Learning Techniques (SysML), Dec. 2008, pp. 1-6.

Dickinson, et al., "Finding Failures by Cluster Analysis of Execution Profiles", Retrieved at << http://ieeexplore.ieee.org/stamp/stamp.jsp?tp=&arnumber=919107 >>, Proceedings of the 23rd International Conference on Software Engineering, ICSE 2001, May 12-19, 2001, pp. 339-348.

Mirgorodskiy, et al., "Problem Diagnosis in Large-Scale Computing Environments", Retrieved at << ftp://ftp.cs.wisc.edu/paradyn/papers/Mirgorodskiy06ProblemDiagnosis.pdf >>, Conference on High Performance Networking and Computing, Proceedings of the 2006 ACM/IEEE conference on Supercomputing, Nov. 11-17, 2006, pp. 13.

Yuan, et al., "Automated Known Problem Diagnosis with Event Traces", Retrieved at << http://www.cs.cmu.edu/~nlao/publication/older/p375-yuan.pdf >>, ACM SIGOPS Operating Systems Review, vol. 40, No. 4, Proceedings of the 2006 EuroSys conference, Oct. 2006, pp. 375-388.

Ernst, et al., "Dynamically Discovering Likely Program Invariants to Support Program Evolution", Retrieved at << http://www.cs.washington.edu/homes/memst/pubs/invariants-tse2001.pdf >>, IEEE Transactions on Software Engineering, vol. 27, No. 2, Feb. 2001, pp. 99-123.

Chen, et al., "Exploiting Local and Global Invariants for the Management of Large Scale Information Systems", Retrieved at << http://www.nec-labs.com/~gfj/chen-icdm-08.pdf >>, Proceedings of the 8th IEEE International Conference on Data Mining (ICDM 2008), Dec. 15-19, 2008, pp. 113-122.

Jiang, et al., "Efficient and Scalable Algorithms for Inferring Likely Invariants in Distributed Systems", Retrieved at << http://ieeexplore.ieee.org/stamp/stamp.jsp?tp=&arnumber=4339216 >>, IEEE Transactions on Knowledge and Data Engineering, vol. 19, No. 11, Nov. 2007, pp. 1508-1523.

Chen, et al., "Failure Detection and Localization in Component Based Systems by Online Tracking", Retrieved at << http://citeseerx.istpsu.edu/viewdoc/download?doi=10.1.1.94.5474&rep=rep1&type=pdf >>, The Eleventh ACM SIGKDD International Conference on Knowledge Discovery and Data Mining, Aug. 2005, pp. 750-755.

Fu, et al., "Execution Anomaly Detection in Distributed Systems through Unstructured Log Analysis", Retrieved at << http://research.microsoft.com/pubs/102365/DM790-CR.pdf >>, ICDM 2009, The Ninth IEEE International Conference on Data Mining, Dec. 6-9, 2009, pp. 10.

Tan, et al., "SALSA: Analyzing Logs as State Machines", Retrieved at << http://www.usenix.org/event/wasl08/tech/slides/tan_slides.pdf >>, Carnegie Mellon University Parallel Data Lab Technical Report CMU-PDL-08-112, Sep. 2008, pp. 1-27.

Cotroneo, et al., "Investigation of Failure Causes in Work-Load Driven Reliability Testing", Retrieved at << http://delivery.acm.org/10.1145/1300000/1295089/p78-cotroneo.pdf?key1=1295089&key2=5296141721&coll=GUIDE&dl=GUIDE&CFID=84518345&CFTOKEN=62716797 >>, Foundations of Software Engineering, Fourth international workshop on Software quality assurance: in conjunction with the 6th ESEC/FSE joint meeting, Sep. 3-4, 2007, pp. 78-81.

Jiang, et al., "Multi-Resolution Abnormal Trace Detection Using Varied-Length N-grams and Automata", Retrieved at << http://www.ecesutgers.edu/~parashar/Classes/05-06/ece572/ds/jiang-icac-05-slides.ppt >>, International Conference on Autonomic Computing, Proceedings of the Second International Conference on Automatic Computing, Jun. 13-16, 2005, pp. 10.

"Hadoop", Retrieved at << http://hadoop.apache.org/core >>, pp. 3.

Fisher, et al., "Incremental Learning of System Log Formats", Retrieved at << http://www.cs.princeton.edu/~dpw/papers/incremental-0609.pdf >>, Workshop on the Analysis of System Logs, Oct. 2009, pp. 1-6.

Donoho, et al., "Sparse Solutions of Underdetermined Linear Equations by Stagewise Orthogonal Matching Pursuit", Retrieved at << http://www-stat.stanford.edu/~donoho/Reports/2006/StOMP-20060403.pdf >>, Mar. 2006, pp. 1-39.

* cited by examiner

LOG MESSAGE ANOMALY DETECTION

BACKGROUND

A software system, such as a program executed on a computer, can generate a console log message that may be used to troubleshoot the program. For example, console log messages are typically unstructured free-form text strings, which can record events or states of interest and capture a system developers' intent. These logs can be read by a developer or user to detect the events, states and other interesting occurrences, for example. Usually, when a program execution fails (e.g., does not perform according to expectations), system operators can examine recorded log files to gain insight about the failure, and find out the potential root causes. These logs can be utilized for debugging distributed systems, where checking the console logs to locate system problems, which is usually most applicable, as an instrumentation or dump based approach may make a system to behavior differently from its daily execution and introduce overhead.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

Large-scale data centers may consist of thousands of distributed components including servers, network devices, distributed computing software components, and operating systems, for example. Due to an increasing scale and complexity of distributed systems, it may be very time consuming for a human operator to diagnose system problems by manually examining a great amount of log messages. Therefore, in this example, automated tools for problem diagnosis through log analysis are desirable for use in diagnosis of distributed systems.

Current and previous automatic detection systems and techniques check logs with a set of rules that describe normal system behaviors. These rules are typically manually predefined by experts according to their knowledge about system design and implementation. However, it can be very expensive to manually define such rules because a great amount of system experts' efforts are often used. Further, modern systems often comprise multiple components developed by different groups or even different companies, and a single expert may not have the complete knowledge of the system, necessitating close cooperation of multiple experts. Additionally, after a system upgrade, the experts may need extra efforts to check or modify the predefined rules again.

Some current statistic learning based automatic tools have been developed that can analyze console logs, profiles and measurements for system monitoring and trouble shooting. These approaches typically extract features from logs, traces or profiles, then use statistical techniques, such as subspace analysis, clustering and classification algorithms to automatically build models, then identify failures or problems according to the learned models. However, most of the learned models are black box models that cannot be easily understood by human operators. That is, for example, they may detect anomalies in a high dimensional feature space, but do not provide intuitive and meaningful explanations for the detected anomalies.

Accordingly, one or more techniques and/or systems are disclosed that can be used to mine system invariants from console logs based on a statistical learning technique. For example, program invariants have clear physical meanings that can be easily understood by a human operator. Therefore, these techniques can detect system problems and give a meaningful interpretation for respective detected anomaly, for example. In one embodiment, an interpretation can associate the anomaly with program execution logic, which can significantly help system operators to diagnose system problems.

In one embodiment for detecting anomalies in a message log, a log message is parsed from an unstructured text string to a structured form, such as by breaking it into a message signature and parameters. Structured log messages that contain a same value of a same program variable are grouped together and one or more invariants are identified from respective types of log message groups. In order to detect anomalies, invariants are applied to log sequences of respective log types.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
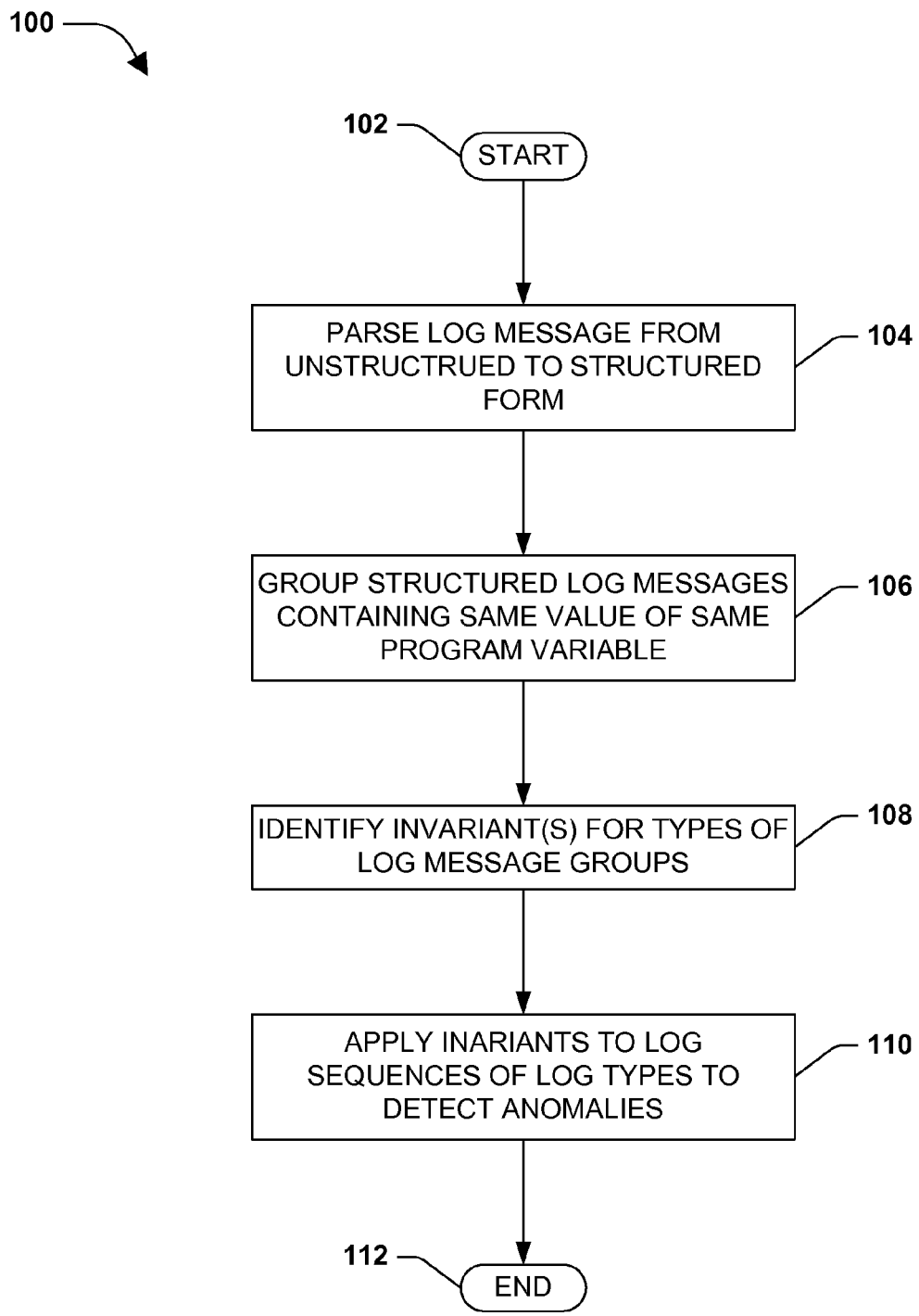
FIG. 1 is a flow diagram of an exemplary method for detecting anomalies in a message log.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

A method may be devised that provides for mining system invariants from console logs, such as from a program execution, for example, based on a statistical learning technique. Unlike current and previous approaches, a program invariant can have a clear physical meaning that may be easily understood by a human operator, for example. An exemplary method may detect system problems and provide a meaningful interpretation for detected anomalies. Such an interpretation, for example, can associate the anomaly with execution logic, which can significantly help system operators to diagnose system problems.

FIG. 1 is a flow diagram of an exemplary method 100 for detecting anomalies in a message log. The exemplary method 100 begins at 102 and involves parsing a log message from an unstructured text string to a structured form, at 104. For example, for most systems, log messages are usually unstructured free-form text messages, which can be difficult to for a computer to directly process. In one embodiment of log parsing, a log message can be converted from an unstructured text string to a tuple-form representation that comprises a timestamp, a message signature (e.g., a constant free form text string representing a log message type), and a list of message parameter values.

At 106, structured log messages that contain a same value of a same program variable are grouped. In one embodiment, after parsing, it may be determined whether a set of parameters correspond to a same program variable (e.g., from an executed program from which the log messages are created). In this embodiment, log messages that comprise a same value of a same program variable can be grouped together. For example, log messages containing a same request ID value can be grouped together. Further, by dividing log messages into some close inner-related groups, for example, computational costs can largely be reduced.

At 108, one or more invariants are identified for respective types of log message groups. In one embodiment, after grouping log messages, a compact sparse integer invariant set can be determined, for example, for respective types of the log message groups. In one embodiment, message groups that are extracted according to the same program variable may be considered as the same type of group. For example, the group of log messages with a request ID #1 # and the group of log messages with a request ID #2# can be the same type of message groups. In one embodiment, a brute force searching algorithm can be combined with a greedy searching algorithm to make the invariant searching process more tractable.

At 110, invariants are applied to log sequences of respective log types to detect anomalies. In one embodiment, after obtaining one or more sets of invariants, the obtained sets can be applied to detect anomalies. For example, a log sequence that violates an invariant can be labeled as an anomaly. In this example, by detecting the anomalies in the message logs from an executed program, problems in the execution may be identified automatically, that is, mitigating human involvement in manually searching through the logs to look for errors.

Having applied the invariants to log sequences to detect anomalies, the exemplary method 100 ends at 112.

Figure 2:
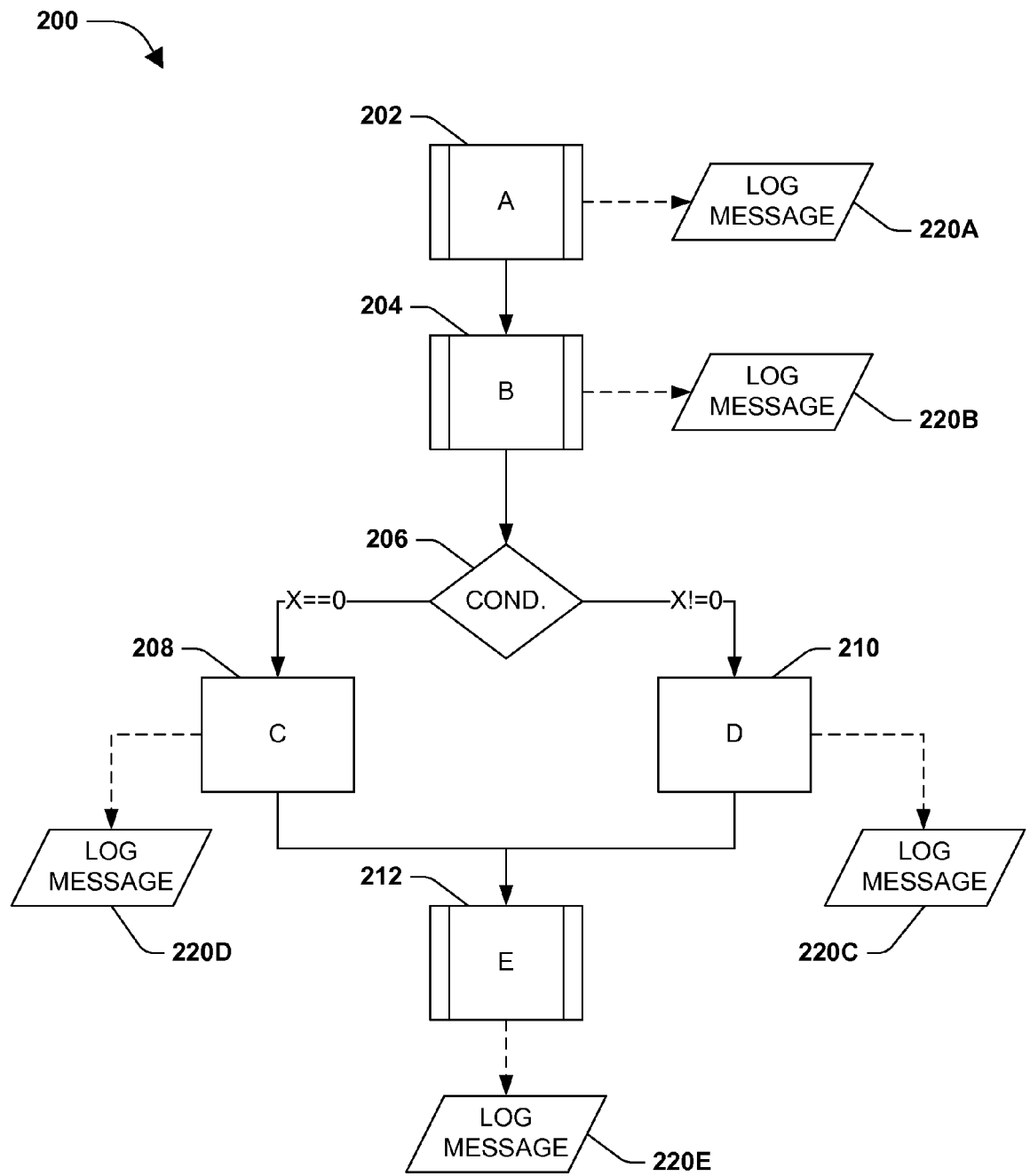
FIG. 2 is a flow diagram illustrating an example environment where one or more techniques, described herein, may be implemented.

FIG. 2 is a flow diagram illustrating an example environment 200 where one or more techniques, described herein, may be implemented. For example, a program invariant (e.g., from an executed program) can be a predicate that holds a same value under different workloads or inputs. Program invariants can be defined from various aspects of a system, for example, including system measurements (e.g. CPU and network utilization) and program variables. Further, other than the program variables and system measurements, program execution flows can also introduce invariants (e.g., values that don't change). In one embodiment, where log sequences provide a desired amount of information for system execution paths, invariants can be obtained for program execution flows by analyzing log sequences.

A simple example of program execution flow is illustrated in FIG. 2, comprising stages of the program execution: A 202, B 204, C 208, D 210, and E 212, where an example condition 206 may be present to direct the flow accordingly. In this embodiment 200, a system executing the program can print a corresponding log message 220A-E at the respective stages 202-214. Typically, there can be multiple running instances that follow the execution flow 202-214 shown in the exemplary embodiment 200. Further, in some embodiments, different instances may execute different branches and their produced logs may interleave together.

In one embodiment, in the exemplary embodiment of a program execution flow 200, the following equations are to be satisfied:

$$c(A)=c(B)=c(E)$$

$$c(B)=c(C)+c(D)$$

where c(A), c(B), c(C), c(D), c(E) denote a number of log messages 220A-220E in the logs respectively. The respective equations can correspond to a specific invariant of the program execution flow, for example, and validity of such invariants may not be affected by dynamics of the workloads (e.g., varying workloads of the program executed multiple time), a difference of system inputs (e.g., into the program) or an interleaving of multiple instances (e.g., of the program execution).

In one embodiment, these invariants may be identified as execution flow invariants. As an example, a violation of these equations (invariants) may identify a program execution error. Because log sequences can record an underlying execution flow of system components in a program, there may be many such linear equations (e.g., invariants) among the log sequences. In one embodiment, automatically discovering respective invariants from collected historical log data for the program execution may facilitate error detection, for example, and further system management tasks.

Figure 3:
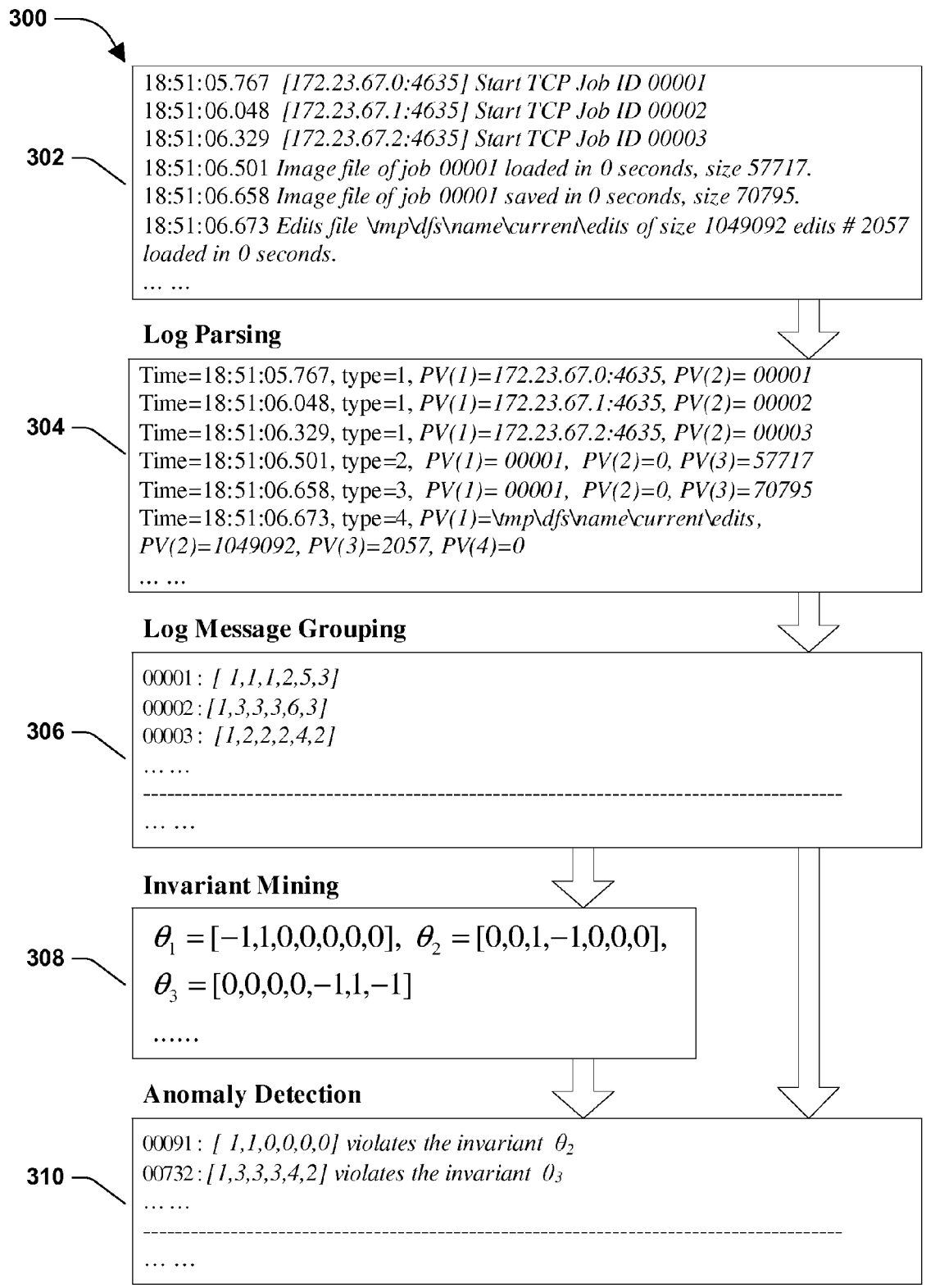
FIG. 3 is an illustration of an exemplary embodiment of acts for detecting anomalies in a message log.

FIG. 3 is an illustration of an exemplary embodiment 300 of acts for detecting anomalies in a message log. In this embodiment 300, the log messages 302 are parsed into structured messages 304. Further, the structured messages 304 are grouped into log message groups 306. Additionally, the log message groups 306 are mined for invariants 308; and the invariants 308 are applied to the log message groups 306 to detect anomalies 310. The exemplary embodiment 300 comprises and overview of the respective acts, which are explained in more detail below.

Figure 4A:
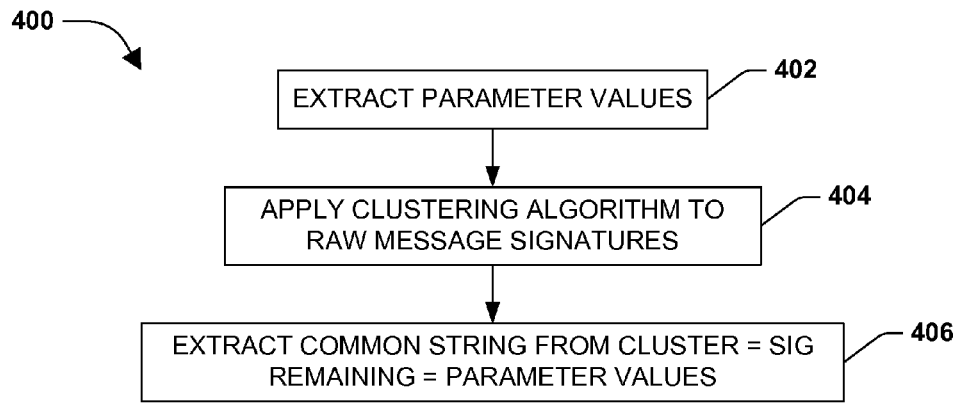
FIG. 4A is a flow diagram illustrating an exemplary embodiment of a method where log messages are parsed.

FIG. 4A is a flow diagram illustrating an exemplary embodiment 400 of a method where log messages are parsed. At 402, parameter values are extracted. For example, log messages can be used to record system events, state changes or inter-component interactions between run-time system components when a program is executed. They are often designed to be read by a human operator (e.g., the developer). Respective log messages are typically comprised of two types of information, for example: a free-form text string that may be used to describe semantic meaning of a recorded program event, and parameters that can be used to identify a specific system object or to record some important states of the current system.

Generally, as an illustrative example, log messages printed by a same log-print statement in a source code are a same type of message, as they may correspond to a same execution point and record a same kind of program event having a same semantic meaning. Alternatively, for example, different types of log messages can be used to record different program events having different semantic meanings, and printed by different log-printed statements. In one embodiment, a free-form text string in the log-print statement can be used as a signature to represent the log message type. As an example, a message signature can correspond to a constant content of respective log messages printed by the same log-print statement. Further, in this embodiment, parameter values can be recorded variable values in the log-print statement, which may vary in different executions.

Figure 4B:
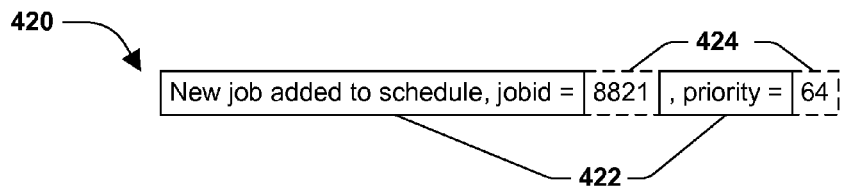
FIG. 4B illustrates an example log message.

As an illustrative example, FIG. 4B illustrates an example log message 420. In this example, 420, the log message can be parsed into message signatures 422 and parameter values 424. Parsing the log messages may be performed more easily if the corresponding source code is available, for example, but this is typically not the case. Therefore, in one embodiment, empirical rules can be applied to extract parameter values 424 leaving raw message signatures 422 (e.g., message types) to be extracted.

As an example, empirical rules and a few general heuristics may be applied to extract some content that meets typical parameter patterns (e.g., 424), such as numbers, uniform resource identifiers (URIs), Internet protocol (IP) addresses, and globally unique identifiers (GUIDs). Further, in this example, after extracting typical parameter values from the log messages by the empirical rules, the remained parts of log messages may be categorized as a set of raw message signatures. Because all of the parameter values may not be extracted by the heuristics empirical rules approach, raw message signatures may still contain some parameter values.

At 404 of the exemplary embodiment 400, of FIG. 4A, a clustering algorithm can be applied to the raw message signatures to obtain a set of clusters (e.g., comprising similar elements). In one embodiment, a weighted string edit distance (e.g., a weighted Levenshtein distance) may be used to evaluate similarity between two raw message signatures. After clustering, a splitting procedure can be applied on the obtained clusters, for example, according to a diversity of content difference in the cluster. In this embodiment, after the splitting processing, final clusters can be obtained.

At 406, for respective final clusters, a common string in the cluster is may be considered as a message signature, and remaining parts can be recognized as parameter values. In this way, in this embodiment, the signatures can be extracted, and the remaining parameter values can be extracted.

Figure 4C:
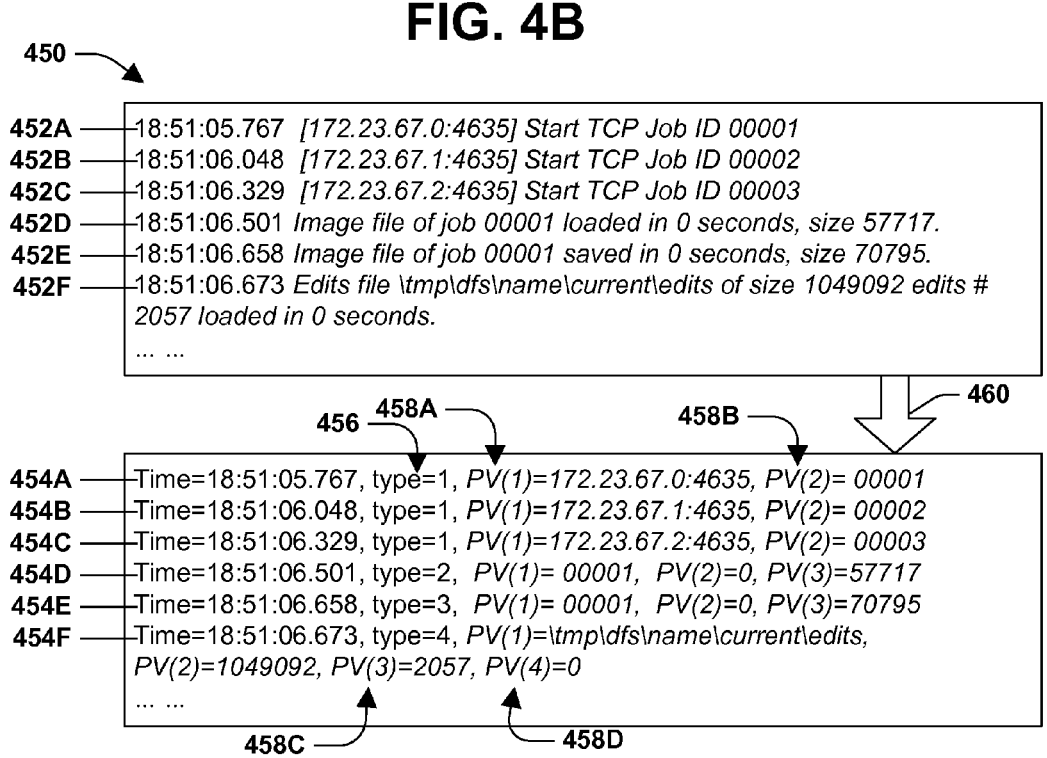
FIG. 4C illustrates an exemplary embodiment of actions wherein one or more messages are parsed.

FIG. 4C illustrates an exemplary embodiment 450 of acts where messages are parsed. In this example, the first three messages 452A-C have a same message type 456 with an index one, and the last three messages 452D-F have different message types 456 with their indexes 2, 3, 4 respectively. In this example 450, message signatures of the different message types are listed as follows:

| Message type index | Message signature |
|---|---|
| 1 | [ ] Start TCP Job ID |
| 2 | Image file of job loaded in seconds, size. |
| 3 | Image file of job saved in seconds, size. |
| 4 | Edits file of size edits # loaded in seconds. |

Further, in this embodiment, after the message signatures (above) and parameter values 458A-D are extracted from the log messages 452A-F, the unstructured log messages 452A-F can be converted 460 to corresponding structured representations 454A-F.

As an example, for a log message in, we can denote an extracted message signature as K(m), a number of parameters as PN(m), and an $i^{th}$ parameter's value as PV (m, i). In this example, after message signature and parameter value extraction, respective log messages in with a time stamp T(m) can be represented by a multi-tuple:

$$[T(m), K(m), PV(m,1), PV(m,2), \ldots, PV(m, PN(m))],$$

which may be designated as a tuple-form representation of the log messages (e.g., 454A-F).

Figure 5A:
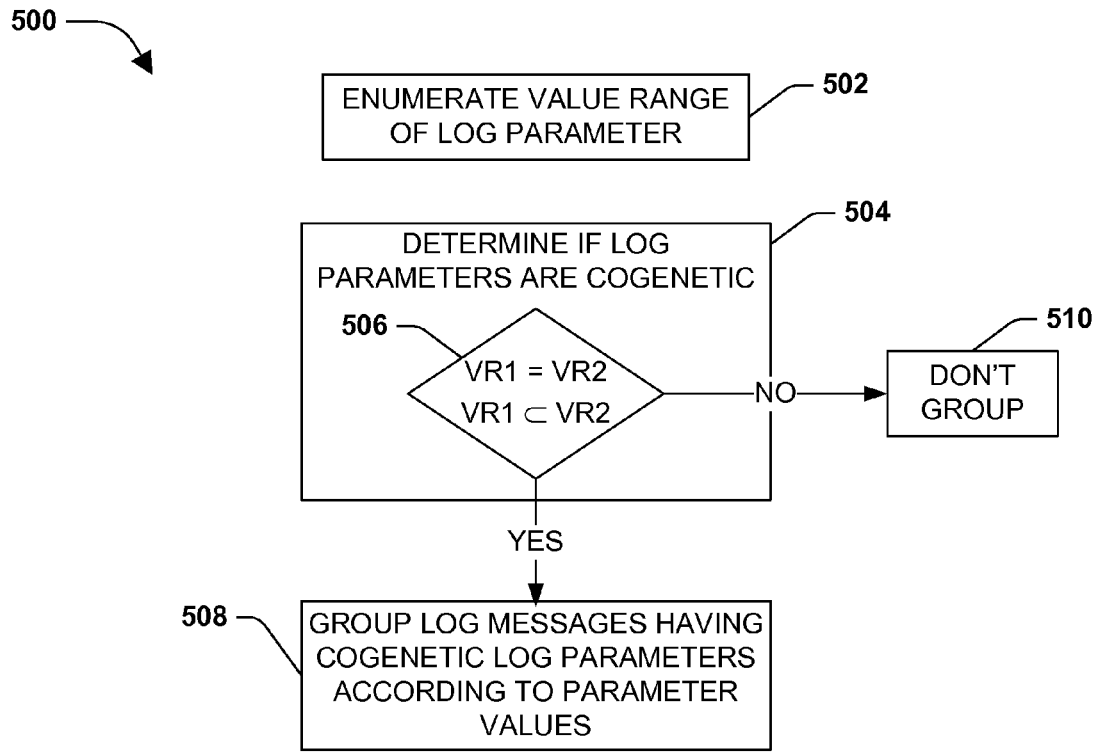
FIG. 5A is a flow diagram illustrating an exemplary embodiment of a method where log messages are grouped.

FIG. 5A is a flow diagram illustrating an exemplary embodiment 500 of a method where log messages are grouped. In one embodiment, parameters can be individually defined by combining a message signature and a position index for a parameter value. For example, in FIG. 4C, a pair ("[ ] Start TCP Job ID"; 2) can define a parameter which has values of 00001, 00002 and 00003 respectively for the first three log messages 452A-C. That is, in this example, the "[ ] Start TCP Job ID" comprises the signature, and the number two indicates the parameter value position 458B (index) for this parameter. In this embodiment, there is a difference between a parameter and a parameter value. For example, a parameter can be an abstract representation of a printed variable in the log-print statement, while a parameter value can be a concrete value in a specific log message.

Developers of programs often print out the same important program variable in multiple log-print statements. In one embodiment, multiple parameters may correspond to a same program variable, which may be considered as cogenetic parameters (e.g., created at a same time and/or in a same place). For example, a program variable (e.g., request ID) can appear as parameters in different log message types, which may be related to execution flow of a request processing.

As another example, as illustrated in FIG. 4C, the first three log messages 452A-C and the fourth log message 452D, the parameter at the position two 458B of the message signature "[ ] Start TCP Job ID," and the parameter at the position one 458A of the message signature "Image file of job loaded in seconds, size" may be cogenetic parameters because they represent a same program variable (e.g., JobID). In this exemplary embodiment, for example, these cogenetic parameters can be grouped.

At 502 in the exemplary embodiment 500 of FIG. 5A, a value range of a log parameter for a log message is enumerated. For example, log messages can be collected several times as a target program runs under different workloads. In this example, for respective times of collection, the collected log messages can comprise a log bunch, which may contain several log files from distributed machines. Further, in one embodiment, a value range for a particular parameter can be determined for the log bunch, comprising the plurality of values from the respective times of collection, for example. In this embodiment, the value range for a particular parameter (e.g., defined by its signature and index) can comprise respective distinct values within respective log bunches. Therefore, for example, a value range for log parameters comprises values from a plurality of execution of a program resulting in a plurality of log messages.

At 504, it can be determined whether a first log parameter and a second log parameter are cogenetic. In one embodiment, this can comprise determining whether the value range of the first log parameter and the value range of the second log parameter are equivalent, or whether the value range of the first log parameter is a sub-set of the value range of the second log parameter, at 506.

In one aspect, determining whether two parameters are cogenetic. can be based on the following observations:

1. In a log bunch, if two parameters (e.g. $P_a$ and $P_b$) are cogenetic (denoted as $P_a \cong P_b$), then either they have the same value ranges (i.e. $V_r(P_a) = V_r(P_b)$), or one parameter's value range is a sub-set of the other's (e.g. $V_r(P_a) \subset V_r(P_b)$). Here, the value range of a parameter $(V_r(P_a))$ is defined by distinct values of the parameter in the log bunch.
2. Two parameters with a larger joint set $V_r(P_a) \cap V_r(P_b)$ (namely the overlapped value range) will have a higher probability to be cogenetic. For two parameters that are not cogenetic, they may have a few identical values in log messages by chance. However, if they have a lot of identical values, we cannot take it for granted that it happens by chance. Therefore, a large overlapped value range often means that two parameters are likely cogenetic.
3. A length of parameter value (e.g., the number of characters of the value in a log message) in the joint set $V_r(P_a) \cap V_r(P_b)$ can identify a higher probability that the parameters are cogenetic. That is, a larger length of parameter can comprise a greater chance of cogenetic parameters. As an example, it is more unlikely that two parameter values having a large length can be identical by chance.

In this aspect, for respective log parameters, for two parameters, if a size of an overlapped (e.g., union) value range is larger than a desired threshold, and a desired minimal length of the parameter value is larger than a desired number of characters (e.g., 3 characters using the text string form of the parameter values in the log messages for analysis), the parameters may be cogenetic. At 510, if the parameters are not cogenetic, they are not grouped.

In this embodiment, at 508, those log messages having cogenetic log parameters are grouped. In one embodiment, a set of parameter groups can be obtained in which parameters in respective groups are cogenetic, where the parameter group corresponds to a program variable. Further, log messages with the same program variable values can be grouped together.

Figure 5B:
FIG. 5B is an illustration of an example embodiment where structured log messages are grouped.

FIG. 5B is an illustration of an example embodiment 550 where structured log messages are grouped. In this example 550, the parameter group which corresponds to the program variable JobID (e.g., from FIG. 4B), the first 552A, the fourth 552D, and the fifth 552E log messages are grouped together 554 at 556A as they all comprise parameters corresponding to JobID and the parameter values are all equal to "00001" at 556A. Further, for respective message groups 556A-C, the number of log messages for respective message types can be counted to obtain a message count vector for further processing.

In one embodiment the following algorithm may be used to identify cogenetic parameters:

1. For respective log parameters, a value range is enumerated within a log bunch.
2. For respective two parameters (e.g. $P_a$ and $P_b$) that satisfy the following rules, they may be cogenetic parameters.
   a. For respective log bunches, $V_r(P_a) \subseteq V_r(P_b)$ or $V_r(P_a) \supset V_r(P_b)$.
   b. $\max(|V_r(P_a)|, |V_r(P_b)|) \geqq 10$
   c. Respective values in $V_r(P_a)$ and $V_r(P_b)$ contain at least 3 characters.
3. Group of cogenetic parameters may be identified as follows:
   a. If $P_a \cong P_b$ and $P_a \cong P_c$, then $P_a$, $P_b$, and $P_c$ are cogenetic parameters.

Figure 6A:
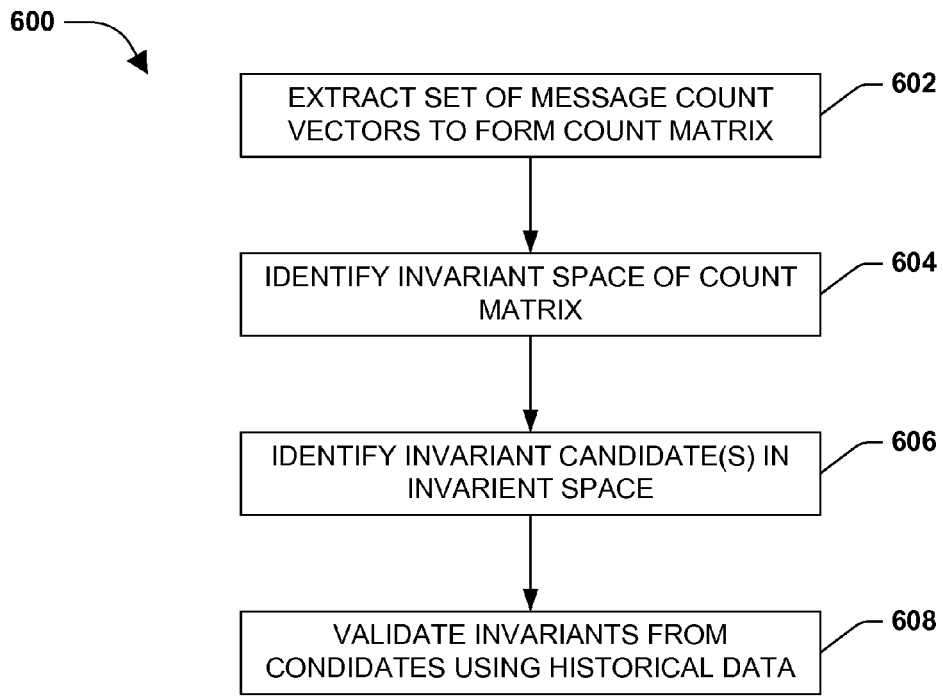
FIG. 6A is a flow diagram illustrating an exemplary embodiment of a method where invariants are identified.
Figure 6B:
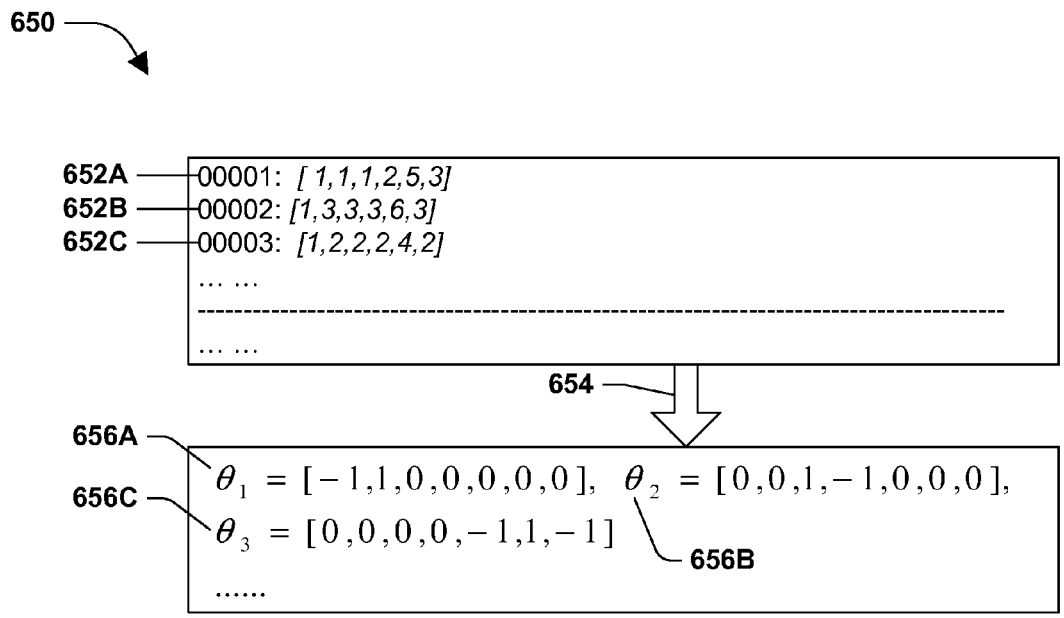
FIG. 6B illustrates an example embodiment where invariants are identified.

FIG. 6A is a flow diagram illustrating an exemplary embodiment 600 of a method where invariants are identified; and FIG. 6B illustrates an example embodiment 650 where invariants are identified. At 602 in 600, a set of message count vectors 656A-C is extracted 654 for respective log message groups 652A-C that are related to a same target program variable, in order to form a count matrix. For example, an invariant linear relationship can be presented as a linear equation, given m different types of log messages, as follows:

$$a_0 + a_1 x_1 + a_2 x_2 + \ldots + a_m x_m = 0$$

where $x_j$ is a number of the log messages whose type index is j; $\theta = [a_0, a_1, a_2, \ldots, a_m]$ is a vector that represents coefficients in the equation.

Therefore, in one embodiment, an invariant can be represented by the vector $\theta$. For example, an invariant can be represented by the vector $\theta = [0, 0, 1, -1, -1, 0]$. In this example, the message type indexes of A to E are 1 to 5 respectively. Further, given a group of log sequences $L_i$, $i=1, \ldots, n$, that are produced by a series of program executions, for example, the number of respective type of log messages can be counted in respective log sequences, $x_{ij}$, $j=1, \ldots, m$. In this example, $x_{ij}$ is the number of log messages of the $j^{th}$ log message type in the $i^{th}$ log sequence, which can yield the following linear equation:

$$a_0 + a_1 x_{i1} + a_2 x_{i2} + \ldots + a_m x_{im} = 0, \forall i = 1, \ldots, n$$

We can denote a count matrix:

$$X = \begin{bmatrix} 1 & x_{11} & x_{12} & \ldots & x_{1m} \\ 1 & x_{21} & x_{22} & \ddots & x_{2m} \\ \vdots & \vdots & \vdots & \vdots & \vdots \\ 1 & x_{n1} & x_{n2} & \ldots & x_{nm} \end{bmatrix}$$

reformed the above equation as a count matrix expression. That is to say, for example, respective invariant vectors $\theta$ can be a solution of the equation:

$$X\theta = 0.$$

At 604 in the example embodiment 600, an invariant space of the count matrix is identified, and one or more invariant candidates in the invariant space can be identified, at 606. Further, At 608 of the exemplary embodiment 600, invariants from the invariant candidates are validated using collected historical log data.

In this embodiment, for example, two sub-spaces can be derived according to the matrix X: a row space of matrix X, which spans row vectors of X, and null space of matrix X, which is orthogonal complement space to the row space. The above equation yields an invariant θ, which can be a vector in the null space of matrix X. In this embodiment, the null space of matrix X can be the invariant space of the executed program, for example. In this example, respective vectors in the invariant space can represent an execution flow invariant, where the vector in the invariant space is the invariant vector.

In one embodiment, the invariant space can be estimated from the matrix X by singular value decomposition (SVD) operation. As an example, a dimension of the invariant space can be equal to a number of zero singular values of the matrix X, and the invariant space can be a span of corresponding singular vectors. However, in this embodiment, historical logs may contain some log messages caused by program failures, which may influence the singular values, which may result in no zero singular value of the matrix X, for example. In one embodiment, traditional sub-space analysis algorithms can be used to determine the row space according to the energy spectrum.

In one embodiment, the following algorithm may be used to estimate invariant space:

1. SVD operation on matrix X to obtain right-singular vectors (e.g., column vectors of V), where the vectors are list in descending order of singular values.

$$X = U\Lambda V^T$$

2. For i from m to 1, check the $i^{th}$ column vector of V (denoted as $v_i$). If there are more than a desired threshold (e.g., 98% where the failure log message groups are less than 2%). Log message groups satisfying the following condition, where $v_i$ is a validated invariant:

$$|X_j v_i| < \epsilon$$

where $X_j = [1, x_{j,1}, x_{j,2}, \ldots x_{j,m}]$ is a message count vector of the message group j, $\epsilon$ is a threshold. Otherwise, column vector $v_i$ is not an invariant, and we terminate the checking process.

3. All validated column vectors span the program invariant space, and the number of the validated vectors is a dimension of the invariant space.

In one embodiment, the invariant searching algorithm can find a compact set of program sparse invariants, for example, based on the set of message counter vectors. Combinations of non-zero coefficients can be used in different dimensions to construct a potential sparse invariant, for example, and it can be validated by determining if it fits with historical log data. For example, an invariant may fit with the collected historical log data if it is satisfied by more than γ% log message groups. In one embodiment, γ can be a user defined threshold. Further, in this embodiment, the hypothesis of invariants can be constructed with k non-zero coefficients, and the validity of these hypotheses can be sequentially tested.

Figure 7:
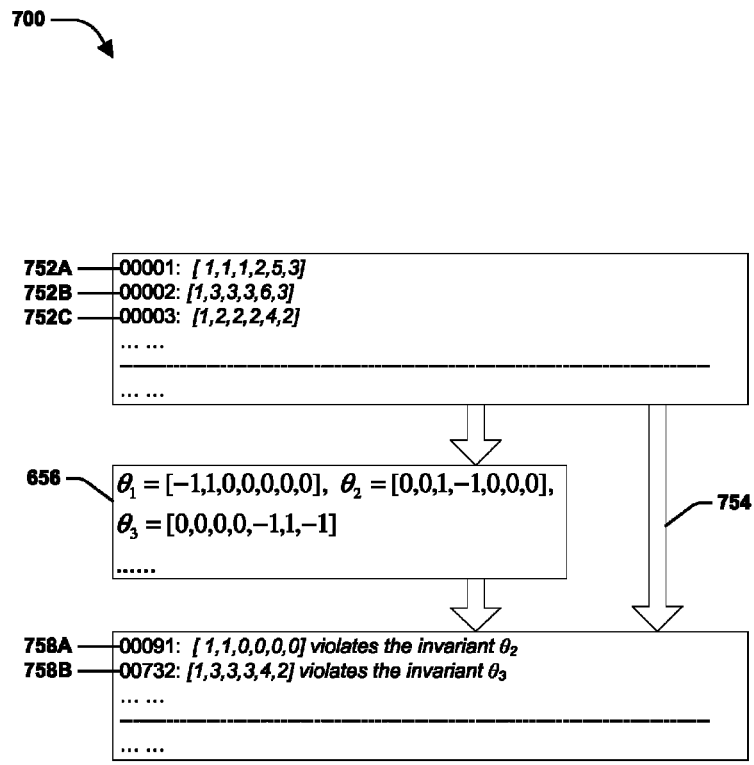
FIG. 7 is an illustration of an example embodiment where invariants are applied to log sequences.

FIG. 7 is an illustration of an example embodiment 700 where the invariants are applied to log sequences. For example, after program invariants 656 are discovered, problems in a program execution, for example, can be detected from console logs. For example, for a new input console log, the calculated count vectors 752A-C for respective message groups can be checked 754 with its related learned invariants 656. Those message groups whose message count vector 752A-C violates any one of its related invariants 656 may be considered as an anomaly 758A&B.

In one embodiment, the mined invariants may reflect elementary execution flows in a program. For example, these program invariants often provide intuitive and meaningful information to human operators, and can help them to locate problems on fine granularity. Therefore, in this embodiment, the respective detected anomalies can be related with the invariants (e.g., 656) that it breaks to provide insight cues for problem diagnosis, for example. In one example, operators can check which invariants are broken by an anomaly, and how many anomalies are raised by the violation of a specific invariant.

Figure 8:
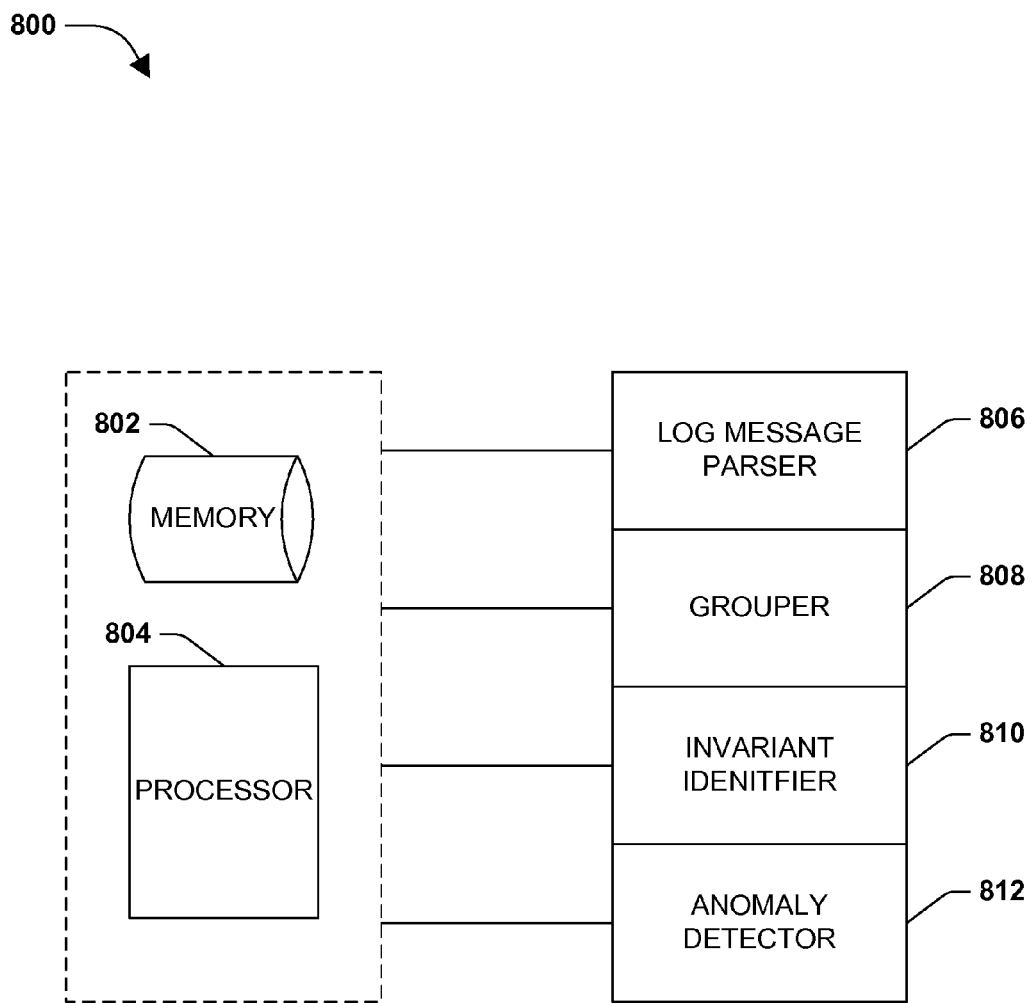
FIG. 8 is a component diagram of an exemplary system for detecting anomalies in a message log.

A system may be devised that provides for mining system invariants from console logs, such as from a program execution. FIG. 8 is a component diagram of an exemplary system 800 for detecting anomalies in a message log. A memory component 802 is used to store data, such as log messages, and a processor 804 is used to process data. In one embodiment, the memory component 802 and processor 804 may be comprised in a computing device together, or alternately, in separate computing devices operably coupled to perform anomaly detection, for example.

A log message parsing component 806 is operably coupled with the memory component 802 and processor 804 for parsing a log message from an unstructured text string to a structured form. For example, the log message parsing component 806 can convert a log message from an unstructured text string to a tuple-form representation that comprises a timestamp, a message signature (e.g., a constant free form text string representing a log message type), and a list of message parameter values.

A grouping component 808 is also operably coupled with the memory component 802 and processor 804, and groups structured log messages that contain a same value of a same program variable. For example, log messages that comprise a same value of a same program variable can be grouped together for the grouping component 808. Further, in this example, log messages that contain a same request ID value can be grouped together by the grouping component 808.

An invariant identification component 810 is operably coupled with the memory component and processor, and identifies one or more invariants for respective types of log message groups. For example, message groups associated with a same program variable may be considered as the same type of group. In one embodiment, the invariant identification component 810 can use a brute force searching algorithm can be combined with a greedy searching algorithm to search for invariants, and extract them.

An anomaly detection component 812 is operably coupled with the memory component and processor, and it applies invariants to log sequences to detect anomalies. For example, an obtained set of invariants can be applied to detect anomalies, and a log sequence that violates an invariant can be labeled as an anomaly. In this example, by detecting the anomalies in the message logs from an executed program, problems in the execution may be identified automatically.

Figure 9:
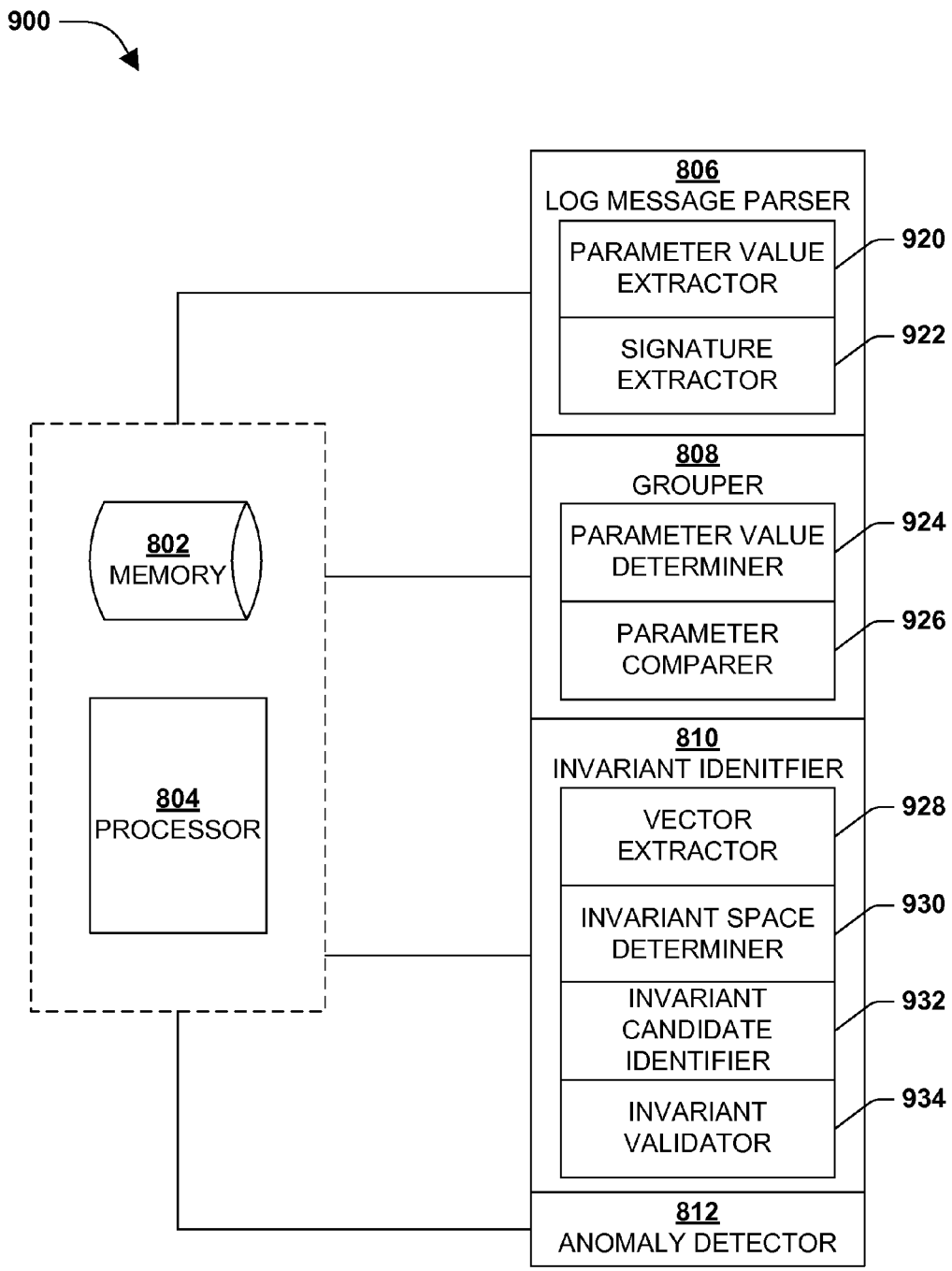
FIG. 9 is a component diagram illustrating one embodiment where one or more systems, described herein, may be implemented.

FIG. 9 is a component diagram illustrating one embodiment 900 where one or more systems, described herein, may be implemented. The log message parsing component 806 comprises a parameter value extraction component 920 that extracts one or more parameter values from the log message using empirical rules, such as by looking for typical parameter patterns (e.g., numbers, URIs, IP addresses, and GUIDs). The log message parsing component 806 can further comprise a signature extraction component 922 that extracts a message signature from the log message using a clustering algorithm.

The grouping component 808 comprises a parameter value determination component 924 that enumerates a value range of a log parameter for a log message, such as from a log bunch (e.g., from a plurality of program executions). Further, the grouping component 808 comprises a parameter comparison component 926 compares log value ranges of parameters to determine if the parameters can be grouped based on value ranges, such as by grouping log messages that contain the same value of the same program variable together.

The invariant identification component 810 comprises a vector extraction component 928, which extracts a set of message count vectors for respective log message groups that are related to a same target program variable, where the count vectors form a count matrix. An invariant space determination component 930 then identifies an invariant space of the count matrix. Further, an invariant candidate identification component 932 can identify one or more invariant candidates in the invariant space using combinations of non-zero coefficients in different dimensions to construct the invariant candidate. Additionally, an invariant validation component 934 can validate invariants from the invariant candidates using collected historical log data. In this way, for example, the validated invariants can be applied to detect anomalies, using the anomaly detection component 812.

Figure 10:
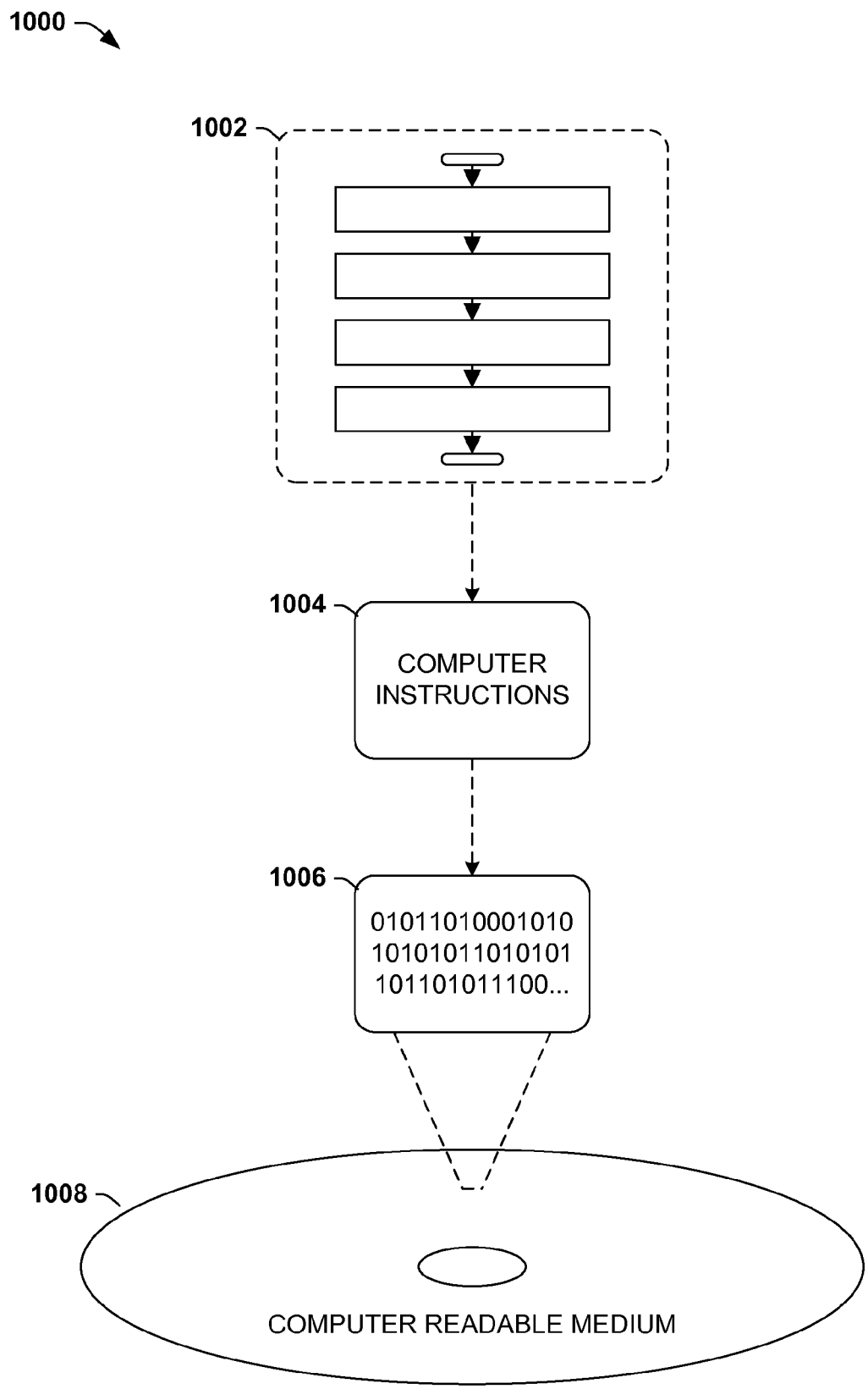
FIG. 10 is an illustration of an exemplary computer-readable medium comprising processor-executable instructions configured to embody one or more of the provisions set forth herein.

Still another embodiment involves a computer-readable medium comprising processor-executable instructions configured to implement one or more of the techniques presented herein. An exemplary computer-readable medium that may be devised in these ways is illustrated in FIG. 10, wherein the implementation 1000 comprises a computer-readable medium 1008 (e.g., a CD-R, DVD-R, or a platter of a hard disk drive), on which is encoded computer-readable data 1006. This computer-readable data 1006 in turn comprises a set of computer instructions 1004 configured to operate according to one or more of the principles set forth herein. In one such embodiment 1002, the processor-executable instructions 1004 may be configured to perform a method, such as the exemplary method 200 of FIG. 1, for example. In another such embodiment, the processor-executable instructions 1004 may be configured to implement a system, such as the exemplary system 800 of FIG. 8, for example. Many such computer-readable media may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 11:
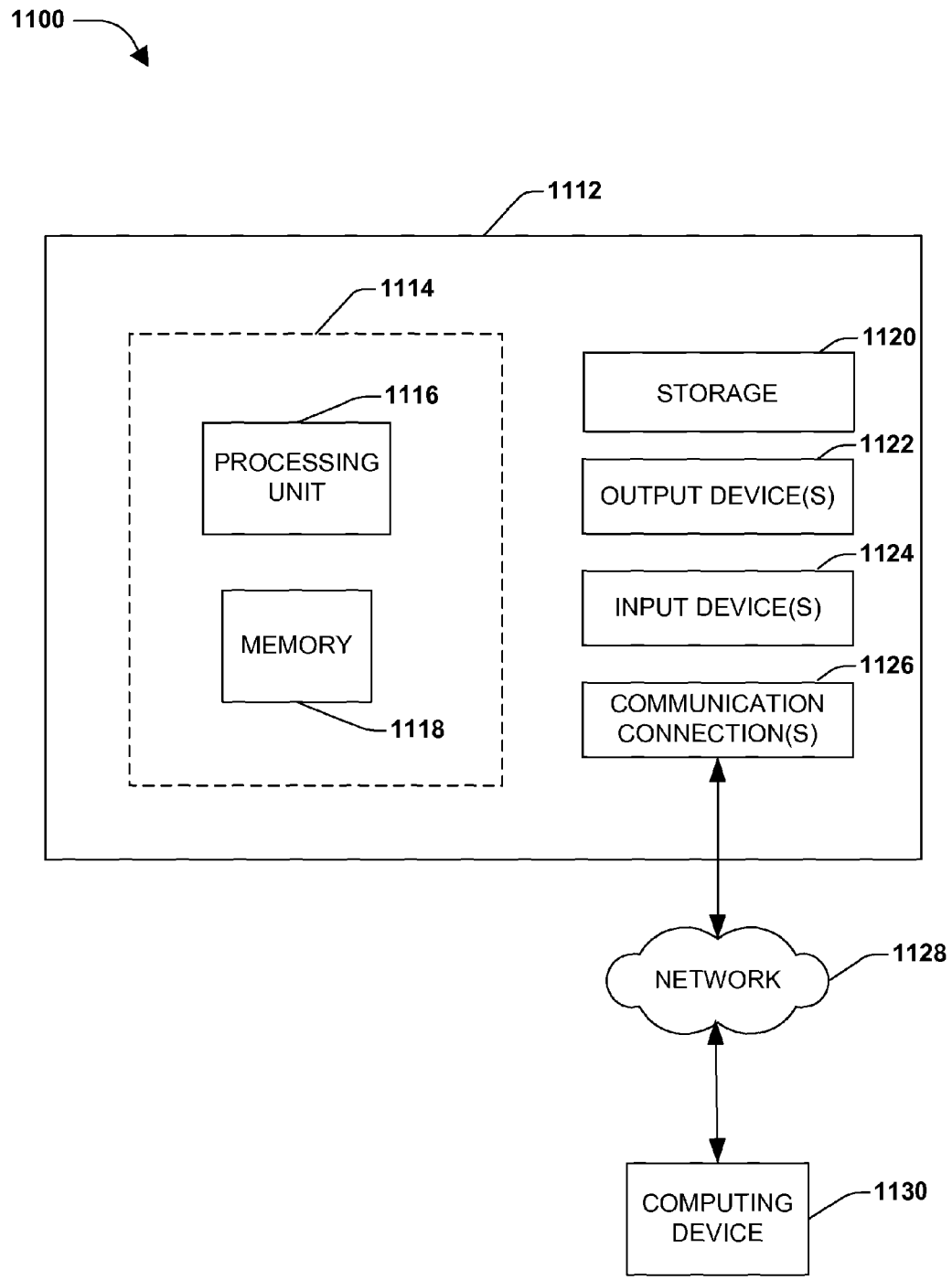
FIG. 11 illustrates an exemplary computing environment wherein one or more of the provisions set forth herein may be implemented.

FIG. 11 and the following discussion provide a brief, general description of a suitable computing environment to implement embodiments of one or more of the provisions set forth herein. The operating environment of FIG. 11 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 11 illustrates an example of a system 1110 comprising a computing device 1112 configured to implement one or more embodiments provided herein. In one configuration, computing device 1112 includes at least one processing unit 1116 and memory 1118. Depending on the exact configuration and type of computing device, memory 1118 may be volatile (such as RAM, for example), non-volatile (such as ROM, flash memory, etc., for example) or some combination of the two. This configuration is illustrated in FIG. 11 by dashed line 1114.

In other embodiments, device 1112 may include additional features and/or functionality. For example, device 1112 may also include additional storage (e.g., removable and/or non-removable) including, but not limited to, magnetic storage, optical storage, and the like. Such additional storage is illustrated in FIG. 11 by storage 1120. In one embodiment, computer readable instructions to implement one or more embodiments provided herein may be in storage 1120. Storage 1120 may also store other computer readable instructions to implement an operating system, an application program, and the like. Computer readable instructions may be loaded in memory 1118 for execution by processing unit 1116, for example.

The term "computer readable media" as used herein includes computer storage media. Computer storage media includes volatile and nonvolatile, removable and non-removable media implemented in any method or technology for storage of information such as computer readable instructions or other data. Memory 1118 and storage 1120 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 1112. Any such computer storage media may be part of device 1112.

Device 1112 may also include communication connection(s) 1126 that allows device 1112 to communicate with other devices. Communication connection(s) 1126 may include, but is not limited to, a modem, a Network Interface Card (NIC), an integrated network interface, a radio frequency transmitter/receiver, an infrared port, a USB connection, or other interfaces for connecting computing device 1112 to other computing devices. Communication connection(s) 1126 may include a wired connection or a wireless connection. Communication connection(s) 1126 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 1112 may include input device(s) 1124 such as keyboard, mouse, pen, voice input device, touch input device, infrared cameras, video input devices, and/or any other input device. Output device(s) 1122 such as one or more displays, speakers, printers, and/or any other output device may also be included in device 1112. Input device(s) 1124 and output device(s) 1122 may be connected to device 1112 via a wired connection, wireless connection, or any combination thereof. In one embodiment, an input device or an output device from another computing device may be used as input device(s) 1124 or output device(s) 1122 for computing device 1112.

Components of computing device 1112 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 1112 may be interconnected by a network. For example, memory 1118 may be comprised of multiple physical memory units located in different physical locations interconnected by a network.

Those skilled in the art will realize that storage devices utilized to store computer readable instructions may be distributed across a network. For example, a computing device 1130 accessible via network 1128 may store computer readable instructions to implement one or more embodiments provided herein. Computing device 1112 may access computing device 1130 and download a part or all of the computer readable instructions for execution. Alternatively, computing device 1112 may download pieces of the computer readable instructions, as needed, or some instructions may be executed at computing device 1112 and some at computing device 1130.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A computer-based method for detecting one or more anomalies in a message log, comprising:
   grouping one or more structured log messages comprising a same value of a same program variable into a group, the grouping comprising:
   determining whether a first log parameter of a first structured log message and a second log parameter of a second structured log message are cogenetic, comprising determining at least one of:
      whether a value range of the first log parameter and a value range of the second log parameter are equivalent; or
      whether the value range of the first log parameter is a subset of the value range of the second log parameter;
   identifying one or more invariants for the group; and
   applying at least some of the one or more invariants to one or more log sequences to detect one or more anomalies, at least some of at least one of the grouping, the identifying, or the applying implemented at least in part using a computer-based processor.

2. The method of claim 1, comprising parsing a log message from an unstructured text string to a structured form, parsing the log message comprising:
   extracting a message signature from the log message; and
   extracting one or more parameter values from the log message.

3. The method of claim 1, comprising parsing a log message from an unstructured text string to a structured form, parsing the log message comprising:

using empirical rules to extract one or more parameter values leaving one or more raw message signatures;

applying a clustering algorithm to at least some of the one or more raw message signatures to obtain a set of one or more clusters; and extracting a common string from a cluster to obtain a signature.

4. The method of claim 1, grouping one or more structured log messages comprising grouping log messages together that comprise one or more log parameters with one or more same parameter values.

5. The method of claim 1, comprising parsing a log message from an unstructured text string to a structured form.

6. The method of claim 1, comprising defining a log parameter by a corresponding message signature.

7. The method of claim 1, comprising deriving a value range.

8. The method of claim 1, grouping one or more structured log messages comprising grouping one or more cogenetic log parameters.

9. The method of claim 1, identifying one or more invariants comprising determining one or more invariants of one or more log message groups corresponding to a same target program variable.

10. The method of claim 1, identifying one or more invariants comprising:

extracting a set of one or more message count vectors for one or more log message groups related to a same target program variable and forming a count matrix;

identifying an invariant space of the count matrix;

identifying one or more invariant candidates in the invariant space; and validating one or more invariants from the one or more invariant candidates using collected historical log data.

11. The method of claim 10, extracting a set of one or more message count vectors comprising counting a number for one or more log message types in a log message group to obtain a message count vector.

12. The method of claim 10, identifying an invariant space comprising estimating the invariant space by singular value decomposition (SVD) operation.

13. The method of claim 10, identifying one or more invariant candidates in the invariant space comprising using one or more combinations of one or more non-zero coefficients in one or more different dimensions to construct an invariant candidate.

14. The method of claim 10, validating one or more invariants comprising determining that an invariant candidate fits with the collected historical log data if the invariant candidate is satisfied by a desired threshold of one or more log message groups.

15. A system for detecting one or more anomalies in a message log, comprising:

a grouping component configured to group one or more structured log messages comprising a same value of a same program variable into a group, the grouping component comprising:

a parameter comparison component configured to compare one or more log value ranges of a plurality of log parameters of at least some of the one or more structured log messages to determine if at least some of the plurality of log parameters can be grouped;

an invariant identification component configured to identify one or more invariants for the group; and an anomaly detection component configured to apply at least some of the one or more invariants to one or more log sequences to detect one or more anomalies, at least some of at least one of the grouping component, the invariant identification component, or the anomaly detection component implemented at least in part via a processor.

16. The system of claim 15, comprising a log message parsing component configured to parse a log message from an unstructured text string to a structured form, the log message parsing component comprising:

a parameter value extraction component configured to extract one or more parameter values from the log message using one or more empirical rules; and a signature extraction component configured to extract a message signature from the log message using a clustering algorithm.

17. The system of claim 15, comprising a log message parsing component configured to parse a log message from an unstructured text string to a structured form.

18. The system of claim 15, the invariant identification component comprising:

a vector extraction component configured to extract a set of one or more message count vectors for one or more log message groups related to a same target program variable, the one or more count vectors configured to form a count matrix; and an invariant space determination component configured to identify an invariant space of the count matrix.

19. The system of claim 18, comprising:

an invariant candidate identification component configured to identify one or more invariant candidates in the invariant space using combinations of non-zero coefficients in one or more different dimensions to construct an invariant candidate; and an invariant validation component configured to validate one or more invariants from the one or more invariant candidates using collected historical log data.

20. A tangible computer-readable storage device comprising instructions that when executed by a processor perform a method for detecting one or more anomalies in a message log, comprising:

grouping one or more structured log messages comprising a same value of a same program variable into one or more groups;

identifying one or more invariants for at least some of the one or more groups, the identifying comprising:

extracting a set of one or more message count vectors for at least some of the one or more groups related to a same target program variable;

forming a count matrix based at least in part on at least some of the set of one or more message count vectors; and identifying an invariant space of the count matrix; and applying at least some of the one or more invariants to one or more log sequences to detect one or more anomalies.

* * * * *